(12) United States Patent
Gu

(10) Patent No.: US 9,509,998 B1
(45) Date of Patent: Nov. 29, 2016

(54) CONDITIONAL PREDICTIVE MULTI-SYMBOL RUN-LENGTH CODING

(71) Applicant: Google Inc., Mountain View, CA (US)

(72) Inventor: Qunshan Gu, Hayward, CA (US)

(73) Assignee: GOOGLE INC., Mountain View, CA (US)

( * ) Notice: Subject to any disclaimer, the term of this patent is extended or adjusted under 35 U.S.C. 154(b) by 868 days.

(21) Appl. No.: 13/856,678

(22) Filed: Apr. 4, 2013

(51) Int. Cl.
*H04N 19/33* (2014.01)
*H04N 19/93* (2014.01)

(52) U.S. Cl.
CPC .............................. *H04N 19/00957* (2013.01)

(58) Field of Classification Search
CPC ................................................ H04N 19/00957
See application file for complete search history.

(56) References Cited

U.S. PATENT DOCUMENTS

| | | |
|---|---|---|
| 4,710,810 A | 12/1987 | Koga |
| 5,016,010 A | 5/1991 | Sugiyama |
| 5,150,209 A | 9/1992 | Baker et al. |
| 5,260,783 A | 11/1993 | Dixit |
| 5,461,423 A | 10/1995 | Tsukagoshi |
| 5,650,782 A | 7/1997 | Kim |
| 5,686,962 A | 11/1997 | Chung et al. |
| 5,708,473 A | 1/1998 | Mead |
| 5,767,909 A | 6/1998 | Jung |
| 5,777,680 A | 7/1998 | Kim |
| 5,818,536 A | 10/1998 | Morris et al. |
| 5,886,652 A | 3/1999 | Adachi et al. |
| 6,125,144 A | 9/2000 | Matsumura et al. |
| 6,157,326 A | 12/2000 | Van Der Vleuten et al. |
| 6,212,234 B1 | 4/2001 | Andoh et al. |
| 6,256,423 B1 | 7/2001 | Krishnamurthy et al. |
| 6,314,208 B1 | 11/2001 | Konstantinides et al. |
| 6,414,995 B2 | 7/2002 | Okumura et al. |
| 6,418,166 B1 | 7/2002 | Wu et al. |

(Continued)

FOREIGN PATENT DOCUMENTS

| CN | 1741616 A | 3/2006 |
|---|---|---|
| CN | 101039430 A | 9/2007 |

(Continued)

OTHER PUBLICATIONS

Park, Jun Sung, et al., "Selective Intra Prediction Mode Decision for H.264/AVC Encoders", World Academy of Science, Engineering and Technology 13, (2006).

(Continued)

*Primary Examiner* — Jay Patel
*Assistant Examiner* — Irfan Habib
(74) *Attorney, Agent, or Firm* — Young Basile Hanlon & MacFarlane, P.C.

(57) ABSTRACT

Conditional predictive multi-symbol run-length coding may include generating a differential residual block based on a residual block and a reconstructed residual block, entropy encoding the differential residual block by determining a symbol order for a plurality of symbols in the differential residual block, grouping the plurality of symbols into at least a first group and a second group based on the symbol order, run-length encoding the plurality of symbols in the differential residual block, by on a condition that a first symbol from the plurality of symbols is associated with the first group, encoding a second symbol from the plurality of symbols, and on a condition that the first symbol is associated with the second group, modifying the second symbol and encoding the modified second symbol.

18 Claims, 8 Drawing Sheets

(56) References Cited

U.S. PATENT DOCUMENTS

| | | |
|---|---|---|
| 6,434,197 B1 | 8/2002 | Wang et al. |
| 6,473,463 B2 | 10/2002 | Agarwal |
| 6,501,860 B1 | 12/2002 | Charrier et al. |
| 6,522,784 B1 | 2/2003 | Zlotnick |
| 6,570,924 B1 | 5/2003 | Lynch et al. |
| 6,661,842 B1 | 12/2003 | Abousleman |
| 6,661,925 B1 | 12/2003 | Pianykh et al. |
| 6,856,701 B2 | 2/2005 | Karczewicz et al. |
| 6,907,079 B2 | 6/2005 | Gomila et al. |
| 6,917,651 B1 | 7/2005 | Yoo et al. |
| 6,985,527 B2 | 1/2006 | Gunter et al. |
| 7,010,032 B1 | 3/2006 | Kikuchi et al. |
| 7,085,425 B2 | 8/2006 | Christopoulos et al. |
| 7,116,831 B2 | 10/2006 | Mukerjee et al. |
| 7,226,150 B2 | 6/2007 | Yoshimura et al. |
| 7,432,329 B2 | 10/2008 | Haubennestel et al. |
| 7,496,143 B2 | 2/2009 | Schwarz et al. |
| 7,599,438 B2 * | 10/2009 | Holcomb ............ H04N 19/70 375/240.23 |
| 7,843,998 B2 | 11/2010 | Bjontegaard |
| 8,064,527 B2 | 11/2011 | Liu et al. |
| 8,116,373 B2 | 2/2012 | Base et al. |
| 8,200,033 B2 | 6/2012 | Mietens et al. |
| 8,254,700 B1 | 8/2012 | Rastogi |
| 8,265,162 B2 | 9/2012 | Tian et al. |
| 8,270,738 B2 | 9/2012 | Raveendran et al. |
| 8,311,119 B2 | 11/2012 | Srinivasan |
| 8,331,444 B2 | 12/2012 | Karczewicz et al. |
| 8,344,917 B2 | 1/2013 | Misra et al. |
| 8,374,445 B2 | 2/2013 | Benndorf |
| 8,401,083 B2 | 3/2013 | Crotty et al. |
| 8,565,541 B2 * | 10/2013 | Choi ................ G06F 3/041 382/232 |
| 8,639,047 B2 * | 1/2014 | Han ............... H04N 19/52 382/236 |
| 8,938,001 B1 | 1/2015 | Bankoski et al. |
| 9,014,260 B2 * | 4/2015 | Alshin ............ H04N 19/105 375/240.01 |
| 2001/0022815 A1 | 9/2001 | Agarwal |
| 2002/0009153 A1 | 1/2002 | Jeon et al. |
| 2002/0036705 A1 | 3/2002 | Lee et al. |
| 2002/0071485 A1 | 6/2002 | Caglar et al. |
| 2002/0080871 A1 | 6/2002 | Fallon et al. |
| 2003/0081850 A1 | 5/2003 | Karczewicz et al. |
| 2003/0128886 A1 | 7/2003 | Said |
| 2003/0215018 A1 | 11/2003 | MacInnis et al. |
| 2003/0227972 A1 | 12/2003 | Fukuda |
| 2004/0013308 A1 | 1/2004 | Jeon et al. |
| 2004/0120398 A1 | 6/2004 | Zhang et al. |
| 2004/0131117 A1 | 7/2004 | Sheraizin et al. |
| 2004/0151252 A1 | 8/2004 | Sekiguchi et al. |
| 2004/0234144 A1 | 11/2004 | Sugimoto et al. |
| 2005/0123207 A1 | 6/2005 | Marpe et al. |
| 2005/0152459 A1 | 7/2005 | Lobo et al. |
| 2005/0180500 A1 | 8/2005 | Chiang et al. |
| 2005/0201470 A1 | 9/2005 | Sievers |
| 2005/0276323 A1 | 12/2005 | Martemyanov et al. |
| 2005/0276333 A1 | 12/2005 | Park |
| 2006/0001557 A1 | 1/2006 | Liao |
| 2006/0098738 A1 | 5/2006 | Cosman et al. |
| 2006/0126724 A1 | 6/2006 | Cote et al. |
| 2006/0203916 A1 | 9/2006 | Chandramouly et al. |
| 2006/0273939 A1 * | 12/2006 | Tanaka ............ H03M 7/40 341/67 |
| 2007/0025441 A1 | 2/2007 | Ugur et al. |
| 2007/0065026 A1 * | 3/2007 | Lee ............... H04N 19/176 382/236 |
| 2007/0127831 A1 | 6/2007 | Venkataraman |
| 2007/0136742 A1 | 6/2007 | Sparrell |
| 2007/0177673 A1 | 8/2007 | Yang |
| 2008/0013633 A1 | 1/2008 | Ye et al. |
| 2008/0089423 A1 * | 4/2008 | Karczewicz ........ H04N 19/159 375/240.23 |
| 2008/0170615 A1 | 7/2008 | Sekiguchi et al. |
| 2008/0181299 A1 | 7/2008 | Tian et al. |
| 2008/0310503 A1 | 12/2008 | Lee et al. |
| 2008/0310745 A1 | 12/2008 | Ye et al. |
| 2009/0175332 A1 | 7/2009 | Karczewicz et al. |
| 2009/0190659 A1 | 7/2009 | Lee et al. |
| 2010/0054328 A1 | 3/2010 | Nozawa |
| 2010/0097250 A1 | 4/2010 | Demircin et al. |
| 2010/0098169 A1 | 4/2010 | Budagavi |
| 2010/0290568 A1 | 11/2010 | Suzuki et al. |
| 2011/0080946 A1 | 4/2011 | Li et al. |
| 2011/0243225 A1 | 10/2011 | Min et al. |
| 2012/0020408 A1 | 1/2012 | Chen et al. |
| 2012/0082220 A1 | 4/2012 | Mazurenko et al. |
| 2012/0140822 A1 | 6/2012 | Wang et al. |
| 2012/0147948 A1 | 6/2012 | Sole et al. |
| 2012/0170647 A1 * | 7/2012 | He ............ H04N 19/48 375/240.03 |
| 2012/0183052 A1 | 7/2012 | Lou et al. |
| 2012/0207222 A1 | 8/2012 | Lou et al. |
| 2012/0236931 A1 | 9/2012 | Karczewicz et al. |
| 2012/0243605 A1 | 9/2012 | Turlikov et al. |
| 2012/0320978 A1 | 12/2012 | Ameres et al. |
| 2012/0328026 A1 | 12/2012 | Sole Rojals et al. |
| 2013/0003829 A1 | 1/2013 | Misra et al. |
| 2013/0003835 A1 | 1/2013 | Sole Rojals et al. |
| 2013/0027230 A1 | 1/2013 | Marpe et al. |
| 2013/0114692 A1 | 5/2013 | Sze et al. |
| 2013/0114716 A1 * | 5/2013 | Gao ............ H04N 19/593 375/240.14 |
| 2014/0177708 A1 | 6/2014 | Alshin et al. |
| 2015/0110173 A1 | 4/2015 | Bultje et al. |
| 2015/0110409 A1 | 4/2015 | Bultje et al. |

FOREIGN PATENT DOCUMENTS

| | | |
|---|---|---|
| EP | 1351510 | 10/2003 |
| EP | 1768415 | 3/2007 |
| EP | 2235950 | 10/2010 |
| EP | 2235950 A1 | 10/2010 |
| EP | 2677750 A1 | 12/2013 |
| JP | 61092073 | 5/1986 |
| JP | 2217088 | 8/1990 |
| JP | 2272970 | 11/1990 |
| JP | 8280032 | 10/1996 |
| JP | 09247682 | 9/1997 |
| JP | 11262018 | 9/1999 |
| JP | 11289544 | 10/1999 |
| JP | 11313332 | 11/1999 |
| JP | 11513205 | 11/1999 |
| JP | 2002141806 | 5/2002 |
| JP | 2003046944 | 2/2003 |
| JP | 2003235044 | 8/2003 |
| JP | 2006033148 A | 2/2006 |
| KR | 100213018 | 8/1999 |
| KR | 20010030916 | 4/2001 |
| WO | WO0150770 | 7/2001 |
| WO | WO03026315 | 3/2003 |
| WO | WO2009091279 A1 | 7/2009 |
| WO | WO2012119463 A1 | 9/2012 |

OTHER PUBLICATIONS

Wiegand, Thomas, Study of Final Committee Draft of Joint Video Specification (ITU-T Rec. H.264 | ISO/IEC 14496-10 AVC), Joint Video Team (JVT) of ISO/IEC MPEG & ITU-T VCEG (ISO/IEC JTC1/SC29/WG11 and ITU-T SG16 Q.6), JVT-F100, Dec. 5, 2002.

Auyeung C. et al.:"parallel processing friendly simplified context selection of significance map", 4.JCT-VC Meeting; 95. MPEG Meeting; Jan. 20, 2011-Jan. 28, 2011; Daegu; (Joint Collaborative Team on Video Coding of IS/IEC JTC1/SC29/WG11 and ITU-T SG.16); URL:http://wftp3.itu.int/AV-ARCH/JCTVC-Site/, No. JCTVC-D260, Jan. 16, 2011, all pages.

Canadian Office Action in CA2810899, related to U.S. Appl. No. 13/253,385, mailed Jan. 25, 2015.

Chenjie Tu et al., "Context-Based Entropy of Block Transform Coefficients for Image Compression" IEEE 11, No. 11, Nov. 1, 2002, pp. 1271-1283.

(56) References Cited

OTHER PUBLICATIONS

ISR & Written Opinion in Application # PCT/US2012/024608; mailed Jun. 5, 2012.
ISR and Written Opinion of the International Searching Authority, for Int'l Application No. PCT/US2012/020707; Feb. 15, 2012, 15 pages.
J-R Ohm, et al., "Report of the 4th JCT-VC Meeting", JCT-VC Meeting, Jan. 24, 2011.
Lou J, et al., "On Context Selection for Significant_Coeff_Flag Coding", 96. MPEG Meeting Mar. 21-Mar. 25, 2011, JCTVC-E362.
Lou, Jian, et al., "Parallel Processing Friendly Context Modeling for Significance Map Coding in CABAC",4.JCT-VC Meeting; 95. MPEG Meeting; Jan. 20, 2011-Jan. 28, 2011; Daegu; (Joint Collaborative Team on Video Coding of IS/IEC JTC1/SC29/WG11 and ITU-T SG.16); URL:http://wftp3.itu.int/AV-ARCH/JCTVC-SITE/, No. JCTVC-D241, Jan. 19, 2011, all pages.
Marpe et al., Context-Based Adaptive Binary Arithmetic Coding in the H.264/AVC Video Compression Standard, Detlev marpe, IEEE Transactions on Circuits and Systems for Video Technology, vol. 13, No. 7, Jul. 2003, 17 pages.
Richardson, "H.264/MPEG-4 Part 10: Introduction to CABAC," Oct. 17, 2002.
Sole, et al., Parallel Context Processing for the significance map in high coding efficiency. Joel Sole, JCTVC_D262, ver 1, 2011-01016.
Sze V, et al.,"CE11: Simplified context selection for significan t_coeff_flag (JCTVC-C227)", JCT_VC Meeting, Jan. 15, 2011.
Vadim Seregin, et al., "Low-Complexity Adaptive Coefficients Scanning", Joint Collaborative Team on Video Coding (JCT-VC) of ITU-T SG16 WP3 and ISO/IEC JTC1/SC29 WG11, vol. JCTCV-C205, Oct. 2, 2010, all pages.
Wiegand, et al., Overview of th H.264/AVC Video Coding Standard, IEEE Transactions on Circuits and Systems for Video Technology, p. 1-19, Jul. 2003.
Winken (Fraunhofer HHI) M. et al., "Description of Video Coding Technology Proposal by Fraunhoffer HHI", 1. JCT-VC Meeting Apr. 15. 2010-Apr. 23, 2010; Dresden; (Joint Collaborative Team on Video Coding of IS/IEC JTC1/SC29/WG11 and ITU-T SG.16); JCTVC-A116, URL:http://wftp3.itu.int/AV-ARCH/JCTVC-SITE/, No. Apr. 24, 2010, all pages.
"Series H: Audiovisual and Multimedia Systems; Infrastructure of audiovisual services—Coding of moving video; Advanced video coding for generic audiovisual services". H.264. Version 1. International Telecommunication Union. Dated May 2003.
"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.
"VP6 Bitstream & Decoder Specification". Version 1.02. On2 Technologies, Inc. Dated Aug. 17, 2006.
"Series H: Audiovisual and Multimedia Systems; Infrastructure of audiovisual services—Coding of moving video". H.264. Amendment 2: New profiles for professional applications. International Telecommunication Union. Dated Apr. 2007.
"VP6 Bitstream & Decoder Specification". Version 1.03. On2 Technologies, Inc. Dated Oct. 29, 2007.
"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.
"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.
"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.
"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.
"VP8 Data Format and Decoding Guide". WebM Project. Google On2. Dated: Dec. 1, 2010.
Bankoski et al. "VP8 Data Format and Decoding Guide; draft-bankoski-vp8-bitstream-02" Network Working Group. Dated May 18, 2011.
Bankoski et al. "Technical Overview of VP8, An Open Source Video CODEC for the Web". Dated Jul. 11, 2011.
Bankoski, J., Koleszar, J., Quillio, L., Salonen, J., Wilkins, P., and Y. Xu, "VP8 Data Format and Decoding Guide", RFC 6386, Nov. 2011.
Mozilla, "Introduction to Video Coding Part 1: Transform Coding", Video Compression Overview, Mar. 2012, 171 pp.

\* cited by examiner

CONDITIONAL PREDICTIVE MULTI-SYMBOL RUN-LENGTH CODING

TECHNICAL FIELD

This application relates to encoding and decoding of video stream data for transmission or storage using lossless encoding.

BACKGROUND

Digital video can be used, for example, for remote business meetings via video conferencing, high definition video entertainment, video advertisements, or sharing of user-generated videos. Due to the large amount of data involved in video data, high performance compression is needed for transmission and storage. Accordingly, it would be advantageous to provide conditional predictive multi-symbol run-length coding.

SUMMARY

Disclosed herein are aspects of systems, methods, and apparatuses for conditional predictive multi-symbol run-length coding.

An aspect is a method for conditional predictive multi-symbol run-length coding which may include encoding a video stream including a plurality of frames by generating a residual block based on a current block from a current frame from the plurality of frames, generating a reconstructed residual block based on the residual block, generating a differential residual block based on the residual block and the reconstructed residual block, and entropy encoding the differential residual block. Entropy encoding the differential residual block may include determining a symbol order for a plurality of symbols in the differential residual block, grouping the plurality of symbols into at least a first group and a second group based on the symbol order, and run-length encoding the plurality of symbols in the differential residual block. Run-length encoding the plurality of symbols in the differential residual block may include on a condition that a first symbol from the plurality of symbols is associated with the first group, encoding a second symbol from the plurality of symbols, and on a condition that the first symbol is associated with the second group, modifying the second symbol and encoding the modified second symbol. The method for conditional predictive multi-symbol run-length coding which may include transmitting or storing an output including the encoded differential residual block.

Another aspect is a method for conditional predictive multi-symbol run-length coding which may include encoding a video stream including a plurality of frames by generating a residual block based on a current block from a current frame from the plurality of frames, generating a reconstructed residual block based on the residual block, generating a differential residual block based on the residual block and the reconstructed residual block, and entropy encoding the differential residual block. Entropy encoding the differential residual block may include determining a symbol order for a plurality of symbols in the differential residual block, grouping the plurality of symbols into at least a first group and a second group based on the symbol order, and run-length encoding the plurality of symbols in the differential residual block. Run-length encoding the plurality of symbols in the differential residual block may include determining a run-length indicator based on a cardinality of consecutive symbols associated with the first group, on a condition that a first symbol from the plurality of symbols is associated with the first group, encoding a second symbol from the plurality of symbols, and on a condition that the first symbol is associated with the second group, modifying the second symbol and encoding the modified second symbol. Modifying the second symbol may include on a condition that the first symbol is greater than zero, decreasing the second symbol by one less than the first symbol, and on a condition that the first symbol is less than zero, decreasing the second symbol by one more than the first symbol. The method for conditional predictive multi-symbol run-length coding which may include transmitting or storing an output including the encoded differential residual block.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Digital video may be used for various purposes including, for example, remote business meetings via video conferencing, high definition video entertainment, video advertisements, and sharing of user-generated videos. Digital video streams may represent video using a sequence of frames or images. Each frame can include a number of blocks, which may include information indicating pixel attributes, such as color values or brightness. Transmission and storage of video can use significant computing or communications resources. Compression and other encoding techniques may be used to reduce the amount of data in video streams.

Compression techniques can result in lossy compression, wherein some information is lost during the encoding and decoding process, and lossless compression, wherein all, or nearly all, of the information is retained. Lossless encoding may have a low compression ratio, indicating the number of bits used to represent unencoded video data relative to the number of bits used to represent the corresponding encoded video data is low compared to the compression ratio of lossy encoding.

Conditional predictive multi-symbol run-length coding can improve compression ratios for lossless encoding of video data based on spatial correlation in a residual after predictive coding. A two stage coding process may generate a differential between a lossless residual and a reconstructed lossy residual. Run-length coding may further compress the differential by identifying spatial correlation and modifying correlated symbols to reduce entropy.

Figure 1:
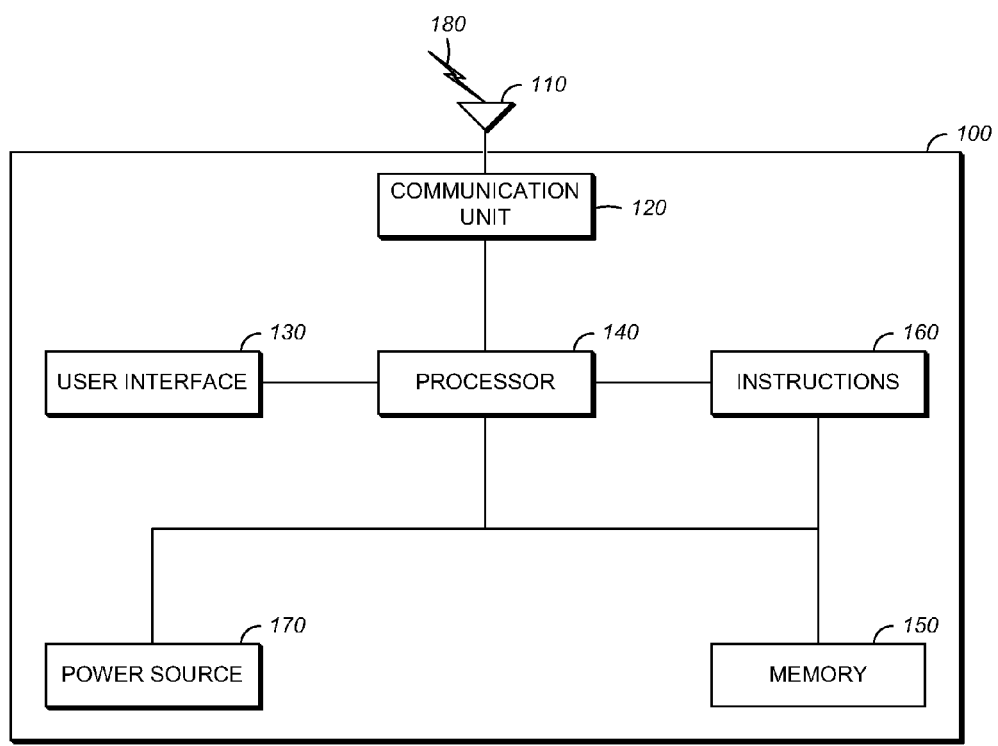
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a general purpose processor, a special purpose processor, a conventional processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
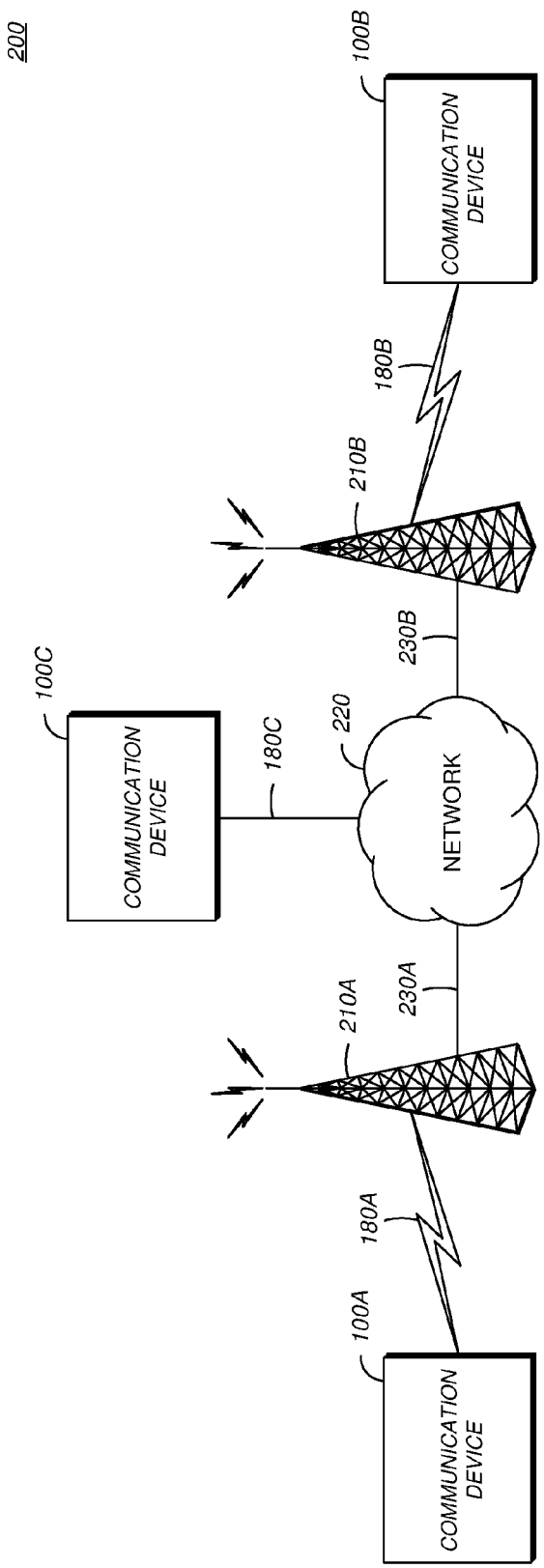
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
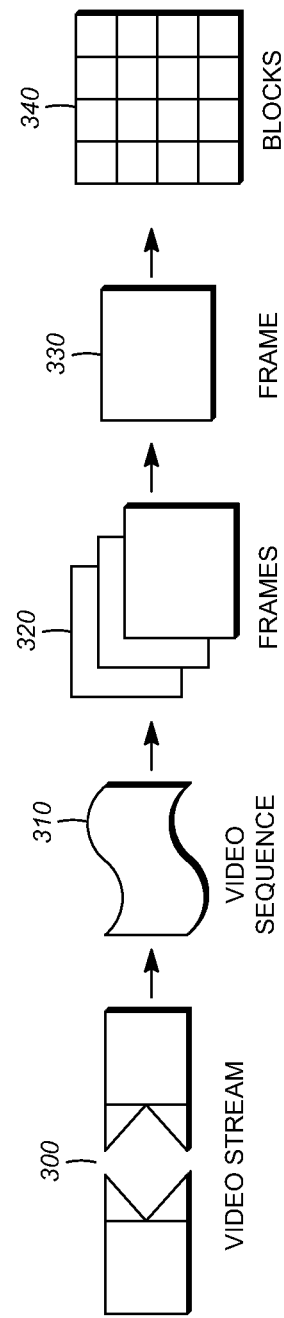
FIG. 3 is a diagram of a video stream for use in frame interpolation in accordance with implementations of this disclosure.

FIG. 3 is a diagram of a video stream 300 for use in encoding, decoding, frame interpolation, or any combination thereof, in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
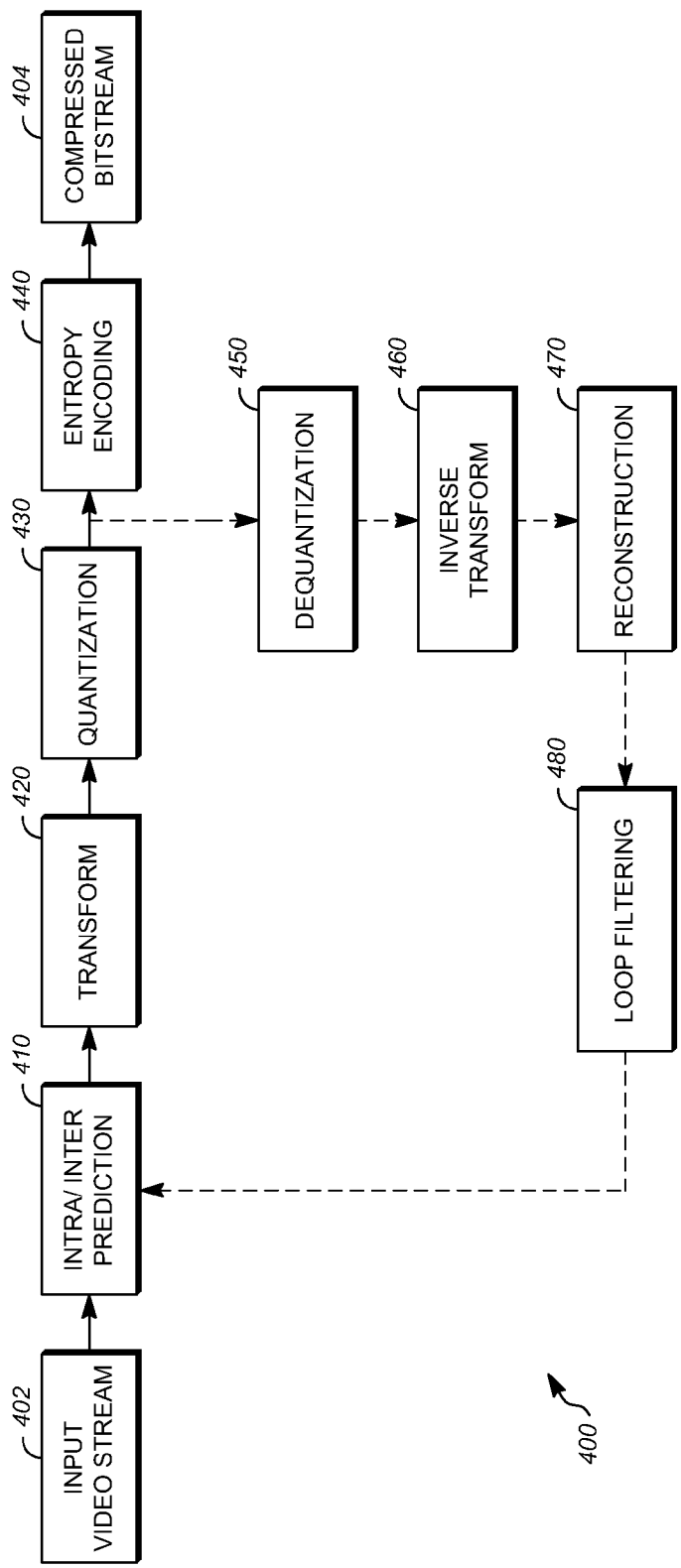
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3 to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference block in the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), and the Singular Value Decomposition Transform (SVD). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
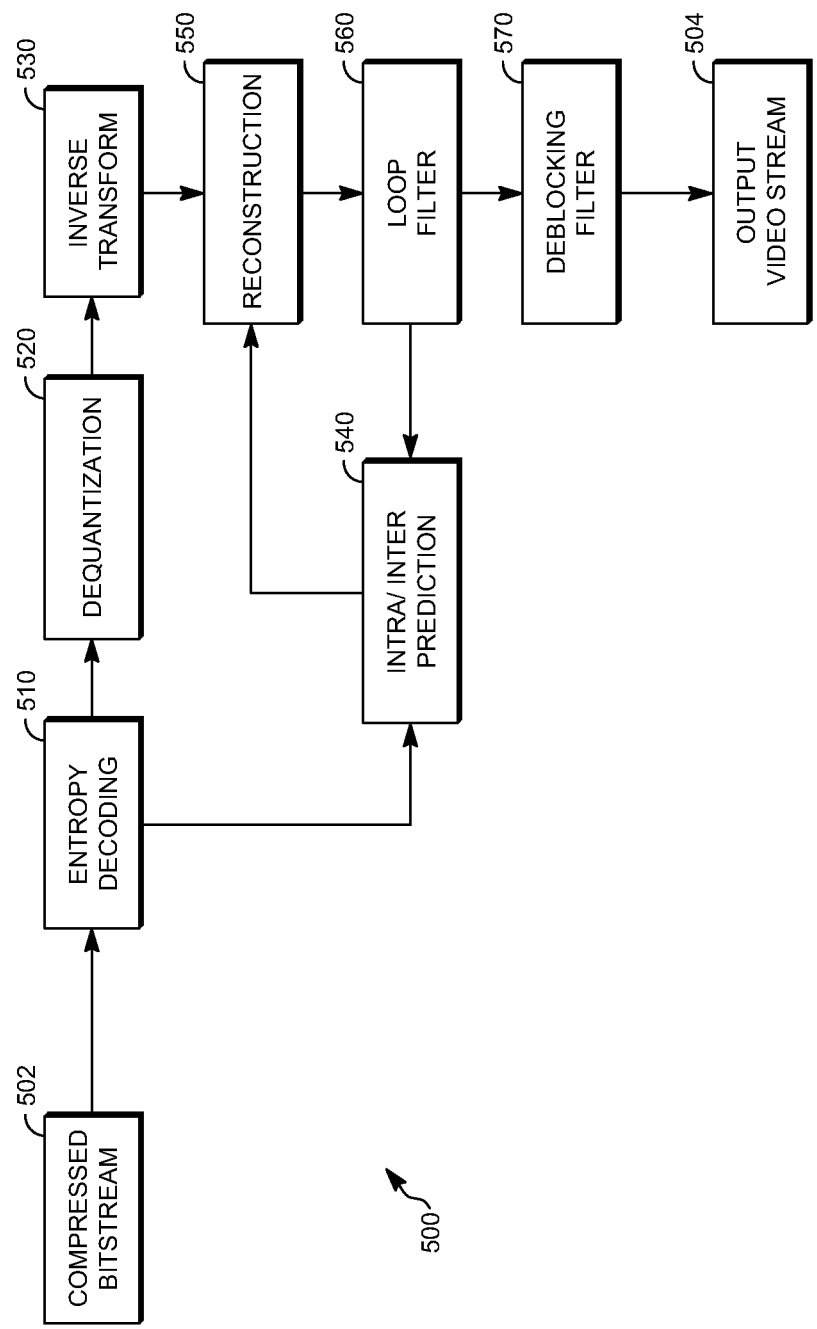
FIG. 5 is a block diagram of a decoder 500 in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a reconstructed block. The loop filtering unit 480 can be applied to the reconstructed block to reduce distortion, such as blocking artifacts.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to decode video data as described herein. The decoder 400 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond with the derivative residual block generated by the inverse transformation unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a reconstructed block. The loop filtering unit 560 can be applied to the reconstructed block to reduce blocking artifacts. The deblocking filtering unit 570 can be applied to the reconstructed block to reduce blocking distortion, and the result may be output as the output video stream 504.

Other variations of the decoder 500 can be used to decode the compressed bitstream 502. For example, the decoder 500 can produce the output video stream 504 without the deblocking filtering unit 570.

Figure 6:
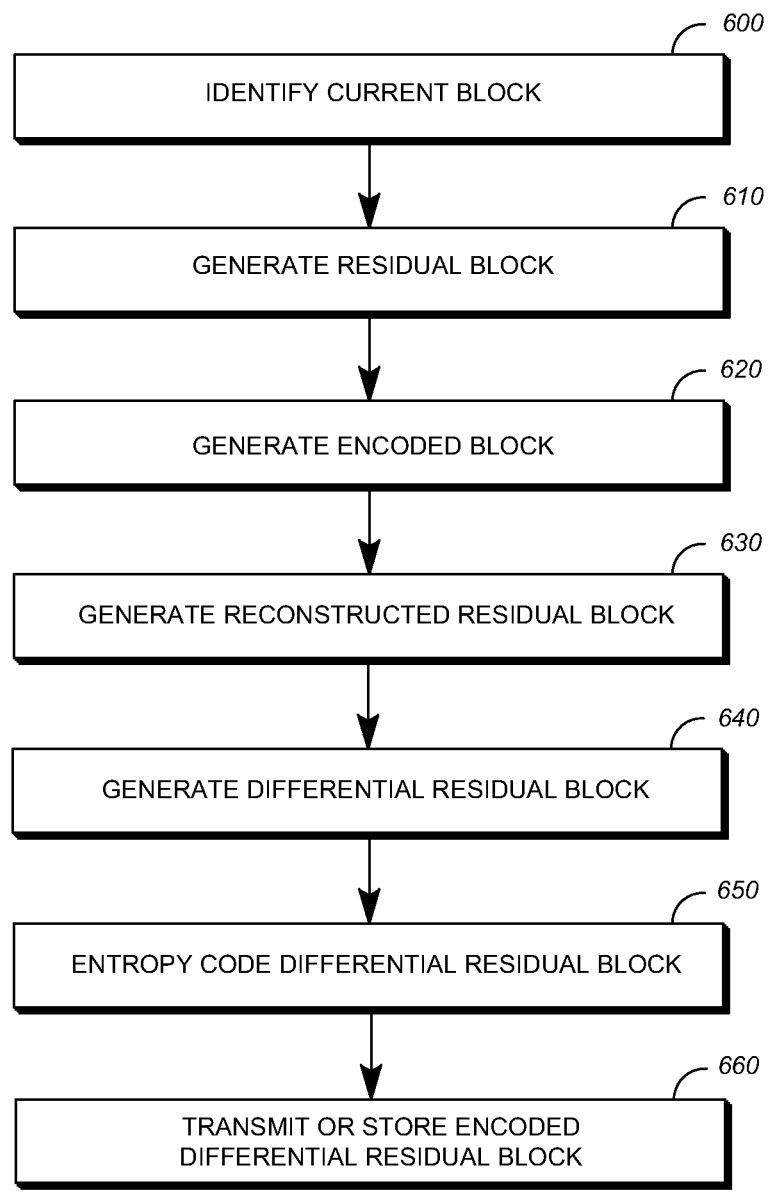
FIG. 6 shows an example of conditional predictive multi-symbol run-length coding in accordance with implementations of this disclosure.

FIG. 6 shows an example of conditional predictive multi-symbol run-length coding in accordance with implementations of this disclosure. In some implementations, lossless coding can include spatial domain coding, transform domain coding, or a combination of transform domain and spatial domain coding. In some implementations, conditional predictive multi-symbol run-length coding may include using two-stage lossless coding, multi-symbol run-length coding, or a combination thereof. In some implementations, conditional predictive multi-symbol run-length coding may include using correlations within spatial residuals, may increase run-length span, may reduce code-word length, may reduce resource utilization, such as bit-spending, or a combination thereof. In some implementations, conditional predictive multi-symbol run-length coding may be implemented in an encoder, such as the encoder 500 shown in FIG. 5.

In some implementations, conditional predictive multi-symbol run-length coding may include identifying a current block at 600, generating a residual block at 610, generating an encoded block at 620, generating a reconstructed residual block at 630, generating a differential residual block at 640, entropy encoding the differential residual block at 650, transmitting or storing the encoded differential residual block at 660, or any combination thereof.

In some implementations, a current block may be identified at 600. Identifying a current block at 600 may include identifying an input video stream, such as the video stream 300 shown in FIG. 3, identifying a current frame from the video stream, such as the frame 330 shown in FIG. 3, identifying a current block from the frame, such as a block from the blocks 340 shown in FIG. 3, or any combination thereof. For example, a frame may be processed in raster scan order starting with the block at the upper left hand corner and proceeding along the top row, processing each block in each successive column, until the blocks in the row are processed, and proceeding along successive rows, from top to bottom, processing each block in each column from left to right, until the blocks of the frame are processed. The raster scan order described is an example; other scan orders can be used.

In some implementations, a residual block may be generated for the current block at 610. A prediction unit, such as the prediction unit 410 shown in FIG. 4, may generate a residual block by performing intra prediction, inter prediction, or both, to generate a prediction block and subtracting the prediction block from the current block (raw block) to produce the residual block. In some implementations, the residual block may include a matrix of N×N elements, such as pixel values, in the spatial domain. The residual block, or residual error data, may exhibit low energy, such that the residual block may include a many zero value elements and may include a few near-zero elements which may have short run-lengths.

In some implementations, an encoded block may be generated at 620. Generating the encoded block may include generating a transform block based on the residual block, generating a quantized block based on the transformed block, generating an encoded block based on the quantized block, or any combination thereof. For example, a transform unit, such as the transform unit 420 shown in FIG. 4, may transform the residual block to generate a transform block, a quanization unit, such as the quantization unit 430 shown in FIG. 4, may quantize the transform block to generate a quantized block, and an entropy encoding unit, such as the entropy encoding unit 440 shown in FIG. 4, may entropy encode the quantized block to generate the encoded block. Although not shown in FIG. 6, the encoded block may be included in an output, such as the compressed bitstream 404 shown in FIG. 4.

In some implementations, a reconstructed residual block may be generated at 630. Generating the reconstructed residual block may include generating a dequantized block, generating an inverse transformed block, or both. For example, a dequantization unit, such as the dequanitzation unit 450 shown in FIG. 4, may dequantize the quantized block to generate a dequantized block and an inverse transform unit, such as the inverse transform unit 460 shown in FIG. 4, may inverse transform the dequantized block to generate the reconstructed residual block.

In some implementations, a differential residual block may be generated at 640. For example, the differential residual block may indicate the difference between the residual block generated at 610 and the reconstructed residual block generated at 630.

In some implementations, the differential residual block may be entropy encoded at 650. Entropy encoding of the differential residual block is described with reference to FIG. 8 below.

The encoded differential residual block may be transmitted or stored at 660. For example, the differential residual block may be included in the output, and the output may be transmitted to another device, such as the decoder 500 shown in FIG. 5, via a wired or wireless communication system, such as the wireless network shown in FIG. 2.

Other implementations of conditional predictive multi-symbol run-length coding as shown in FIG. 6 are available. In implementations, additional elements of conditional predictive multi-symbol run-length coding can be added, certain elements can be combined, and/or certain elements can be removed. For example, in an implementation, conditional predictive multi-symbol run-length coding can include an additional element involving reducing local correlation of data, the element at 660 can be skipped and/or omitted for one or more blocks and/or frames.

Conditional predictive multi-symbol run-length coding, or any portion thereof, can be implemented in a device, such as the computing and communication devices 100A/100B/100C shown in FIG. 2. For example, an encoder, such as the encoder 300 shown in FIG. 3, can implement conditional predictive multi-symbol run-length coding, or any portion thereof, using instruction stored on a tangible, non-transitory, computer readable media, such as memory 150 shown in FIG. 1.

Figure 7:
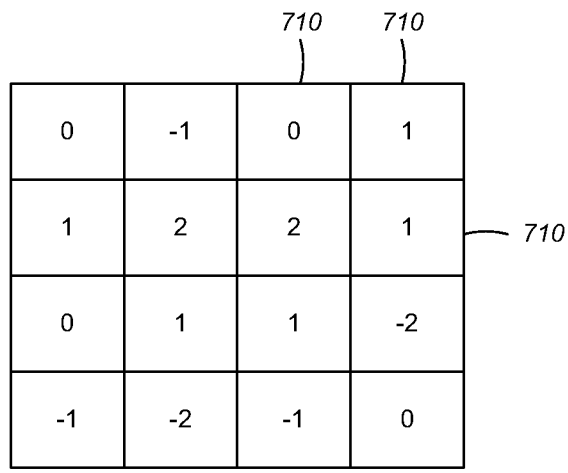
FIG. 7 shows an example of a differential residual block 700 in accordance with implementations of this disclosure.

FIG. 7 shows an example of a differential residual block 700 in accordance with implementations of this disclosure. As shown, the differential residual block 700 includes a 4×4 matrix of elements 710, which may be represent pixels; however, any size block may be used. In some implementations, the differential residual block 700 may be processed in raster scan order. For example, a one dimensional array may be generated from the two dimensional residual block, which may be expressed as 0, −1, 0, 1, 1, 2, 2, 1, 0, 1, 1, −2, −1, −2, −1, 0.

Figure 8:
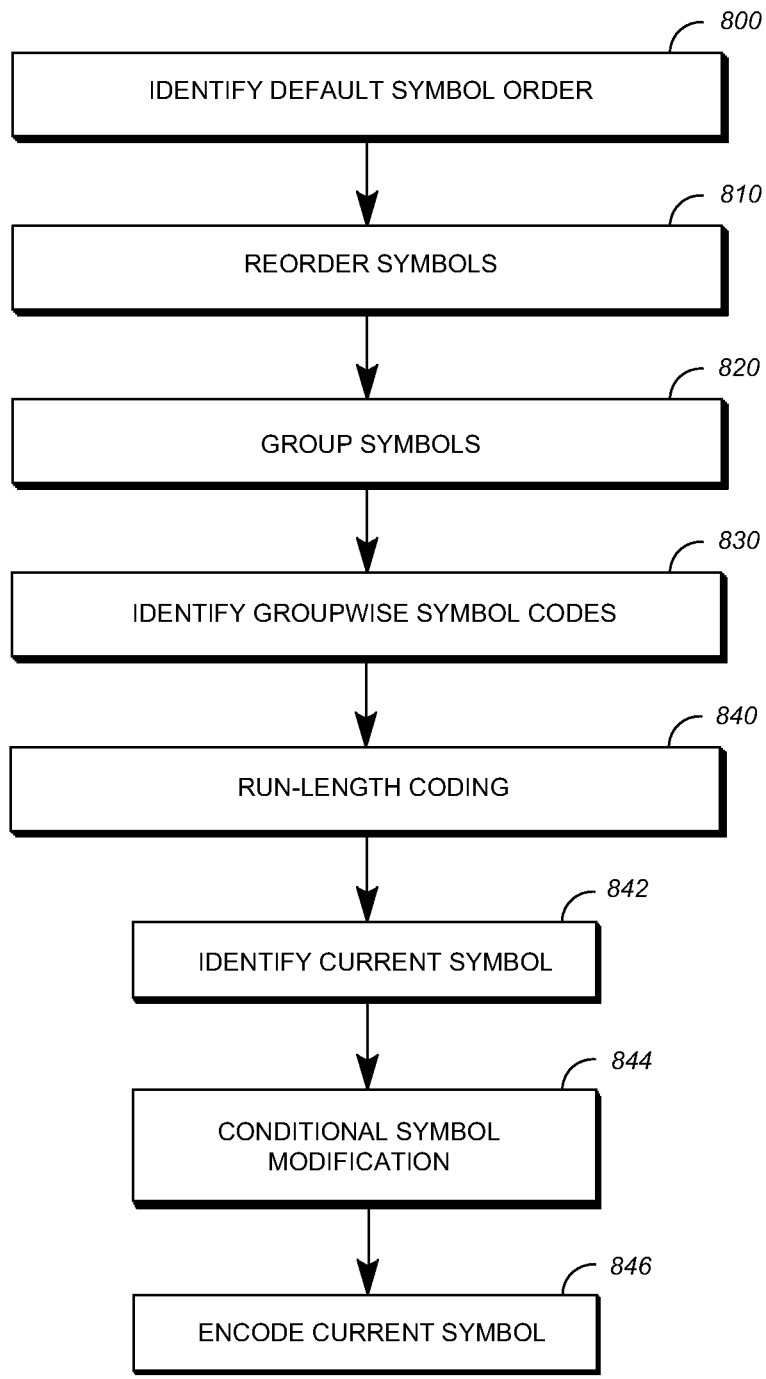
FIG. 8 shows an example of entropy encoding using conditional predictive multi-symbol run-length coding in accordance with implementations of this disclosure.

FIG. 8 shows an example of conditional predictive multi-symbol run-length entropy coding in accordance with implementations of this disclosure. In some implementations, conditional predictive multi-symbol run-length coding may include entropy coding a block, such as the differential residual block 700 shown in FIG. 7 or the differential residual block generated at 640 in FIG. 6. Entropy encoding the differential residual block may include identifying a default symbol order at 800, reordering symbols at 810, grouping symbols at 820, identifying group-wise symbol codes at 830, run-length coding at 840, or a combination thereof.

In some implementations, a default symbol order may be identified at 800. The default symbol order may indicate an order of the elements for encoding a default block. For example, the default block may include 2N symbols, and the default symbol order may be 0, 1, −1, 2, −2, . . . N, −N. Code word assignment for entropy coding may be based on the symbol order. For example, shorter code words may be used for encoding symbols at the top of the order, and longer code words may be used for encoding symbols at the bottom of the order.

In some implementations, the symbols may be reordered for an element or group of elements at 810. For example, the symbols may be reordered for a frame, a slice, a segment, a macroblock, or a block. The symbol order may indicated in the output video stream in a header corresponding to the group of elements, such as a picture header, a slice header, a segment header, a macroblock header, or a block header. Signaling symbol removal, reorder, and maximum symbol cardinality may utilize bandwidth and may be more efficiently performed for relatively large groups of elements, such as a slice or segment.

Reordering the symbols may include a removal process, a re-order process, or both. For example, a symbol may be removed and other symbols may be automatically re-ordered in a way that all the symbols behind the removed symbol may be pulled up. A re-order process may put a symbol into a specific location and may push down symbols between the new location and the old location of the re-ordered symbol. The removal process and re-order process may be performed based on analyzing the statistics of the residual error signals in the frame, slice, segment, macroblock, or block. A more frequently used symbol may be pulled ahead in the order and a shorter code word may be used for encoding the more frequently used symbol.

In some implementations, the symbols may be grouped at 820. Grouping the symbols may include associating the symbols with a group based on the symbol order. For example, the symbol the first three symbols in the symbol order may be associated with a first group and the other symbols may be associated with a second group.

In some implementations, group-wise symbol codes may be identified at 830. A symbol code, or code word, may be used to represent a symbol in the output bitstream. For example, the symbol 0 may be represented by the code word 0 and the symbol −3 may be represented by the code word 111. Identifying the group-wise symbol codes may include identifying a variable length code for each symbol associated with each symbol group. For example, the first symbol group may include three symbols (0, 1, −1) that may be represented by the variable length codes 0, 10, and 11 respectively. The second symbol group may include 2N−3 symbols (2, −2, . . . N, −N) that may be represented by the variable length codes 0, 10, 110, 1110, . . . respectively.

In some implementations, the number of symbols in a block may be limited. The last variable length code can use all "1"s for the last symbol. For example, the second group may include two symbols that may be represented by 0 and 1; the second group may include three symbols that may be represented by 0, 10, 11; or the second group may include four symbols that may be represented by 0, 10, 110, 111. The maximum number of symbols in a block can be defined in a header, such as a frame or picture header, a slice header, a segment header, a macroblock header, or a block header.

In some implementations, group-wise run-length coding may be performed at 840. Run-length coding can include using fixed length-codes or variable length codes. Using fixed length codes may include identifying a maximum run-length. The maximum run-length may be indicated in the output video stream in a header, such as a picture header, a slice header, a segment header, a macroblock header, or a block header. In some implementations, the maximum run-length may be inferred based on a default word-length. For example, int(x) may indicate the integer of x with truncation, the maximum run-length of the symbols associated with the first group may be L, and a fixed-length code word of int(log 2(L))+1 may be used to represent the run-length.

In some implementations, a shorter word-length may be used such that the run-length of the first group may be greater than the maximum value of the code word, and a code word may be used to indicate whether to continue or terminate the run with the first group of symbols or that the next symbol would belong to the second group. For example, the code word-length may be four, the maximum run may be 14, and the code word 1110 may indicate a run of length 14 and that the next symbol belongs to the second group and the code word 1111 may indicate that the run is 14 and that the next symbol belongs to the first group. This will allow the use of shorter code words to represent the second group of symbols.

In some implementations, a current symbol may be identified at 842. Although not explicitly shown in FIG. 8, run-length coding the differential residual block may include iteratively coding each symbol in the differential residual block, in, for example, raster scan order. For example, the symbols shown in the differential residual block 700 shown in FIG. 7 may be processed in the following order: 0, −1, 0, 1, 1, 2, 2, 1, 0, 1, 1, −2, −1, −2, −1, 0.

In some implementations, the current symbol may be conditionally modified at 844. For example, a symbol may be modified using first-order prediction on a condition that an adjacent previously coded symbol is associated with the second group of symbols. In some implementations, the modification of a current symbol Sn may be based on the original value, before modification or prediction, of the adjacent previously coded symbol S, and modifying the symbol value may be expressed as the following:

If $(S>0)$ $Sn'=Sn-(S-1);$

If $(S<0)$ $Sn'=Sn-(S+1).$

Modifying a symbol may change the group associated with the symbol. For example, the symbol −2 may be associated with the second group, may be modified to −1 and may be associated with the first group.

The current symbol may be encoded at 846. For example, the current symbol may be represented in the output bitstream using the corresponding group-wise code word identified at 830.

In some implementations, conditional symbol modification may be omitted. For example, the differential residual block 700 shown in FIG. 7 may be processed in the following order: 0, −1, 0, 1, 1, 2, 2, 1, 0, 1, 1, −2, −1, −2, −1, 0 using a three bit run-length code and may be encoded using 39 bits as 101 0 11 0 10 10 0 000 0 100 10 0 10 10 1 001 11 1 010 11 0. The first three bits 101 may indicate a run length of five symbols in the first group followed by a sixth symbol in the second group. The fourth bit 0 may represent the first symbol 0, the fifth through sixth bits 11 may represent the second symbol −1, the seventh bit 0 may represent the third symbol 0, the eighth and ninth bits 10 may represent the fourth symbol 1, the $10^{th}$ and $11^{th}$ bits 10 may represent the fifth symbol 1, and the $12^{th}$ bit 0 may represent the sixth symbol 2, which is associated with the second group. The $13^{th}$ through $15^{th}$ bits 000 may indicate a run including zero symbols in the first group followed by one symbol in the second group. The 16$^{th}$ bit 0 may represent the seventh symbol 2. The 17$^{th}$ through 19$^{th}$ bits 100 may indicate a run-length of four symbols in the first group followed by one in the second group. The 20$^{th}$ and 21$^{st}$ bits 10 may represent the eight symbol 1, the 22$^{nd}$ bit 0 may represent the ninth symbol 0, the 23$^{rd}$ and 24$^{th}$ bits 10 may represent the 10$^{th}$ symbol 1, the 25$^{th}$ and 26$^{th}$ bits 10 may represent the 11$^{th}$ symbol 1, and the 27$^{th}$ bit 1 may represent the 12$^{th}$ symbol −2, which is associated with the second group. The 28$^{th}$ through 30$^{th}$ bits 001 may indicate a run-length of one symbol in the first group followed by one in the second group. The 31$^{st}$ and 32$^{nd}$ bits 11 may represent the 13$^{th}$ symbol −1, and the 33$^{rd}$ bit 1 may represent the 14$^{th}$ symbol −2, which is associated with the second group. The 34$^{th}$ through 36$^{th}$ bits 010 may indicate a run length of two symbols in the first group, the 37$^{th}$ and 38$^{th}$ bits 11 may represent the 15$^{th}$ symbol −1, and the 39$^{th}$ bit 0 may represent the 16$^{th}$ symbol 0. Other run-length encoding formats may be used.

In some implementations, conditional symbol modification may be performed. For example, the differential residual block 700 shown in FIG. 7 may be processed in the following order: 0, −1, 0, 1, 1, 2, 2, 1, 0, 1, 1, −2, −1, −2, −1, 0 using conditional symbol modification. After conditional symbol modification, the differential residual information may be expressed as 0 −1 0 1 1 2 1 0 0 1 1 −2 0 −2 0 0, wherein the unmodified original sixth symbol 2, adjacently preceding the seventh symbol 2, is associated with the second group and the seventh symbol is modified, the unmodified original seventh symbol 2, adjacently preceding the eight symbol 1, is associated with the second group and the eight symbol is modified, the unmodified original 12$^{th}$ symbol −2, adjacently preceding the 13$^{th}$ symbol, is associated with the second group and the 13$^{th}$ symbol is modified, and the unmodified original 14$^{th}$ symbol, adjacently preceding the 15$^{th}$ symbol, is associated with the second group and the 15$^{th}$ symbol is modified.

The differential residual information after conditional symbol modification may be encoded using 34 bits as 101 0 11 0 10 10 0 101 10 0 0 10 10 1 001 0 1 010 0 0. The first three bits 101 may indicate a run length of five symbols in the first group followed by a symbol in the second group. The fourth bit 0 may represent the first symbol 0, the fifth through sixth bits 11 may represent the second symbol −1, the seventh bit 0 may represent the third symbol 0, the eighth and ninth bits 10 may represent the fourth symbol 1, the 10$^{th}$ and 11$^{th}$ bits 10 may represent the fifth symbol 1, and the 12$^{th}$ bit 0 may represent the sixth symbol 2, which is associated with the second group. The 13$^{th}$ through 15$^{th}$ bits 101 may indicate a run length of five symbols in the first group followed by a symbol in the second group. The 16$^{th}$ and 17$^{th}$ bits 10 may represent the seventh symbol 1, the 18$^{th}$ bit 0 may represent the eight symbol 0, the 19$^{th}$ bit may represent the ninth symbol 0, the 20$^{th}$ and 21$^{st}$ bits 10 may represent the 10$^{th}$ symbol 1, the 22$^{nd}$ and 23$^{rd}$ bits 10 may represent the 11$^{th}$ symbol 1, and the 24$^{th}$ bit 1 may represent the 12$^{th}$ symbol −2, which is associated with the second group. The 25$^{th}$ through 27$^{th}$ bits 001 may indicate a run-length of one symbol in the first group followed by a symbol in the second group. The 28$^{th}$ bit 0 may represent the 13$^{th}$ symbol 0, and the 29$^{th}$ bit 1 may represent the 14$^{th}$ symbol −2, which is associated with the second group. The 30$^{th}$ through 32$^{nd}$ bits 010 may indicate a run length of two symbols in the first group. The 33$^{rd}$ bit 0 may represent the 15$^{th}$ symbol 0, and the 34$^{th}$ bit 0 may represent the 16$^{th}$ symbol 0.

Other implementations of conditional predictive multi-symbol run-length entropy coding as shown in FIG. 8 are available. In implementations, additional elements of conditional predictive multi-symbol run-length entropy coding can be added, certain elements can be combined, and/or certain elements can be removed. For example, in an implementation, conditional predictive multi-symbol run-length entropy coding can include an additional element involving indicating symbol reorder in the output bit stream, the element at 810 can be skipped and/or omitted for one or more blocks and/or frames.

Conditional predictive multi-symbol run-length entropy coding, or any portion thereof, can be implemented in a device, such as the computing and communication devices 100A/100B/100C shown in FIG. 2. For example, an encoder, such as the encoder 300 shown in FIG. 3, can implement conditional predictive multi-symbol run-length coding, or any portion thereof, using instruction stored on a tangible, non-transitory, computer readable media, such as memory 150 shown in FIG. 1.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of the transmitting station 100A and/or the receiving station 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 100A and the receiving station 100B do not necessarily have to be implemented in the same manner.

Further, in one implementation, for example, the transmitting station 100A or the receiving station 100B can be implemented using a general purpose computer or general purpose/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The transmitting station 100A and receiving station 100B can, for example, be implemented on computers in a real-time video system. Alternatively, the transmitting station 100A can be implemented on a server and the receiving station 100B can be implemented on a device separate from the server, such as a hand-held communications device. In this instance, the transmitting station 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 100A. Other suitable transmitting station 100A and receiving station 100B implementation schemes are available. For example, the receiving station 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method for encoding a video stream including a plurality of frames, the method comprising:
    generating a residual block based on a current block from a current frame from the plurality of frames;
    generating a reconstructed residual block based on the residual block;
    generating a differential residual block based on the residual block and the reconstructed residual block;
    entropy encoding the differential residual block by:
        determining a symbol order for a plurality of symbols in the differential residual block,
        grouping the plurality of symbols into at least a first group and a second group based on the symbol order,
        run-length encoding the plurality of symbols in the differential residual block, wherein run-length encoding includes:
            on a condition that a first symbol from the plurality of symbols is associated with the first group, encoding a second symbol from the plurality of symbols, and
            on a condition that the first symbol is associated with the second group, modifying the second symbol and encoding the modified second symbol; and
    transmitting or storing an output including the encoded differential residual block wherein entropy encoding the differential residual block includes: associating the first group with a first plurality of code words such that each symbol associated with the first group is represented by a respective code word in the first plurality of code words; associating the second group with a second plurality of code words such that each symbol associated with the second group is represented by a respective code word in the second plurality of code words, wherein at least one code word from the first plurality of code words matches a code word from the second plurality of code words.

2. The method of claim 1, wherein modifying the second symbol includes: on a condition that the first symbol is greater than zero, decreasing the second symbol by one less than the first symbol; and
    on a condition that the first symbol is less than zero, decreasing the second symbol by one more than the first symbol.

3. The method of claim 1, wherein modifying the second symbol includes associating the second symbol with the first group.

4. The method of claim 1, wherein determining the symbol order includes:
    using a default symbol order as the symbol order; and
    selectively reordering a symbol in the symbol order.

5. The method of claim 1, wherein transmitting or storing the output includes indicating the symbol order in a frame header, a slice header, a segment header, a macroblock header, or a block header.

6. The method of claim 1, wherein grouping the plurality of symbols includes associating three symbols from the plurality of symbols with the first group.

7. The method of claim 1, wherein run-length encoding includes including a run-length indicator in the output.

8. The method of claim 1, wherein run-length encoding includes determining a run-length indicator based on a cardinality of consecutive symbols associated with the first group.

9. The method of claim 1, wherein transmitting or storing the output includes indicating a maximum run-length in a frame header, a slice header, a segment header, a macroblock header, or a block header.

10. The method of claim 9, wherein transmitting or storing the output does not include indicating a maximum run-length on a condition that the maximum run-length is inferable based on a default word-length.

11. A method for encoding a video stream including a plurality of frames, the method comprising:
    generating a residual block based on a current block from a current frame from the plurality of frames;
    generating a reconstructed residual block based on the residual block;
    generating a differential residual block based on the residual block and the reconstructed residual block;

entropy encoding the differential residual block by:
- determining a symbol order for a plurality of symbols in the differential residual block,
- grouping the plurality of symbols into at least a first group and a second group based on the symbol order,
- run-length encoding the plurality of symbols in the differential residual block, wherein run-length encoding includes:
  - determining a run-length indicator based on a cardinality of consecutive symbols associated with the first group,
  - on a condition that a first symbol from the plurality of symbols is associated with the first group, encoding a second symbol from the plurality of symbols, and
  - on a condition that the first symbol is associated with the second group, modifying the second symbol and encoding the modified second symbol wherein modifying the second symbol includes:
    - on a condition that the first symbol is greater than zero, decreasing the second symbol by one less than the first symbol; and
    - on a condition that the first symbol is less than zero, decreasing the second symbol by one more than the first symbol; and
- transmitting or storing an output including the encoded differential residual block wherein entropy encoding the differential residual block includes: associating the first group with a first plurality of code words such that each symbol associated with the first group is represented by a respective code word in the first plurality of code words; associating the second group with a second plurality of code words such that each symbol associated with the second group is represented by a respective code word in the second plurality of code words, wherein at least one code word from the first plurality of code words matches a code word from the second plurality of code words.

12. The method of claim 11, wherein modifying the second symbol includes associating the second symbol with the first group.

13. The method of claim 11, wherein determining the symbol order includes: using a default symbol order as the symbol order; and
selectively reordering a symbol in the symbol order.

14. The method of claim 11, wherein transmitting or storing the output includes indicating the symbol order in a frame header, a slice header, a segment header, a macroblock header, or a block header.

15. The method of claim 11, wherein run-length encoding includes including the run-length indicator in the output.

16. The method of claim 11, wherein transmitting or storing the output includes indicating a maximum run-length indicator in a frame header, a slice header, a segment header, a macroblock header, or a block header.

17. The method of claim 11, wherein transmitting or storing the output does not include indicating a maximum run-length on a condition that the maximum run-length is inferable based on a default word-length.

18. A method for encoding a video stream including a plurality of frames, the method comprising:
- generating a differential residual block based on a residual block and a reconstructed residual block;
- entropy encoding the differential residual block using run-length encoding based on groupings of a plurality of symbols from the differential residual block, wherein run-length encoding includes:
  - on a condition that a first symbol from the plurality of symbols is associated with a first group, encoding a second symbol from the plurality of symbols, and
  - on a condition that the first symbol is associated with a second group, modifying the second symbol and encoding the modified second symbol; and transmitting or storing an output including the encoded differential residual block wherein entropy encoding the differential residual block includes: associating the first group with a first plurality of code words such that each symbol associated with the first group is represented by a respective code word in the first plurality of code words; associating the second group with a second plurality of code words such that each symbol associated with the second group is represented by a respective code word in the second plurality of code words, wherein at least one code word from the first plurality of code words matches a code word from the second plurality of code words.

* * * * *